US007652088B2

(12) United States Patent
Nakashima et al.

(10) Patent No.: US 7,652,088 B2
(45) Date of Patent: Jan. 26, 2010

(54) ORGANIC-INORGANIC COMPOSITE MATERIAL AND METHOD FOR PRODUCING THE SAME

(75) Inventors: Michiya Nakashima, Chiba (JP); Satoshi Idemura, Sakura (JP); Toshihiro Ebine, Ichikawa (JP)

(73) Assignee: DIC Corporation, Tokyo (JP)

( * ) Notice: Subject to any disclaimer, the term of this patent is extended or adjusted under 35 U.S.C. 154(b) by 309 days.

(21) Appl. No.: 10/561,601

(22) PCT Filed: Jun. 24, 2004

(86) PCT No.: PCT/JP2004/009296

§ 371 (c)(1), (2), (4) Date: Mar. 27, 2007

(87) PCT Pub. No.: WO2004/113444

PCT Pub. Date: Dec. 29, 2004

(65) Prior Publication Data

US 2007/0293615 A1    Dec. 20, 2007

(30) Foreign Application Priority Data

Jun. 25, 2003   (JP)   ............................. 2003-180968

(51) Int. Cl.
*B01F 17/00* (2006.01)
*C08G 69/28* (2006.01)
(52) U.S. Cl. ...................................... 524/431; 528/336
(58) Field of Classification Search ........................ None
See application file for complete search history.

(56) References Cited

U.S. PATENT DOCUMENTS 5,851,668 A    12/1998  Sandor et al.
5,880,201 A *  3/1999  Enomoto et al. ............. 524/492
6,063,862 A *  5/2000  Idemura et al. ............. 524/606
2002/0025997 A1  2/2002  Yamaguchi et al.

FOREIGN PATENT DOCUMENTS

| EP | 1295903 | 3/2003 |
| JP | 5-111631 | 5/1993 |
| JP | 6-279615 | 10/1994 |
| JP | 8-55707 | 2/1996 |
| JP | 8-157735 | 6/1996 |

(Continued)

OTHER PUBLICATIONS

Supplementary European Search Report mailed on Jul. 3, 2008, issued on the corresponding European patent application No. 04746765.9.

*Primary Examiner*—David Wu
*Assistant Examiner*—Vu Nguyen
(74) *Attorney, Agent, or Firm*—Edwards Angell Palmer & Dodge LLP

(57) ABSTRACT

An organic-inorganic composite material is disclosed wherein an inorganic compound is finely dispersed in an organic polymer matrix in nanometer order and the inorganic compound content is large. The organic-inorganic composite material has formability and flexibility of organic materials and features of various metal compounds (such as hardness, catalytic power, insulating property, semiconducting property, electronic conductivity, ionic conductivity, large specific surface area, high heat resistance, wear resistance, and dimensional stability to temperature changes or moisture absorption) at the same time.

8 Claims, 1 Drawing Sheet

FOREIGN PATENT DOCUMENTS

| | | |
|---|---|---|
| JP | 8-319362 | 12/1996 |
| JP | 10-72531 | 3/1998 |
| JP | 10-176106 | 6/1998 |
| JP | 10-508342 | 8/1998 |
| JP | 2001-261976 | 9/2001 |
| JP | 2002-20603 | 1/2002 |
| JP | 2003-192890 | 7/2003 |
| WO | WO 95/31593 A1 | 11/1995 |

* cited by examiner

US 7,652,088 B2

ORGANIC-INORGANIC COMPOSITE MATERIAL AND METHOD FOR PRODUCING THE SAME

TECHNICAL FIELD

The present invention relates to an organic-inorganic composite material including an inorganic compound and a method for producing thereof.

Priority is claimed on Japanese Patent Application No. 2003-180968, filed Jun. 25, 2003, the content of which is incorporated herein by reference.

BACKGROUND ART

To form composites of inorganic particles such as silica, alumina, titania and zirconia in organic polymers has been widely studied for providing both properties of organic polymers such as formability and flexibility and those of inorganic compound such as heat resistance, wear resistance, and surface hardness. To achieve a sufficient effect to form composites by this method, it is preferable that inorganic particle having small a size as possible be formed in the composite at a high content. The smaller the particle size of the inorganic particles, the larger the surface area per weight of the inorganic particles becomes and the wider the interface region between the organic material and the inorganic particles becomes, thereby a high reinforcement effect can be expected (area effect). The higher the inorganic particle content, the greater is the characteristic of the composite in all reason (volume effect). However, when inorganic particles having a small size and contained at a high content are used to form a composite with the organic polymer, there were problems that the dispersibility of the inorganic particles in the organic polymer becomes low, the agglomerating property increases and the objective properties cannot be obtained.

The inorganic particles inherently differ from the organic polymer in terms of surface properties, specific gravity, heat-stability, and insolubility to chemicals, thereby it is extremely difficult to produce a uniform and fine dispersion when using a high content of inorganic particles. Additionally, inorganic particles of nanometer order are expensive generally and handling thereof is difficult due to the possibility of scattering. When trying to forcibly mix the inorganic particles with the organic matrix using large-scale dispersion equipment such as an extruder, a large quantity of thermal energy is needed (for example, see patent document 1). In example 1 of patent document 1, a melt blending treatment is accomplished at 200° C.

On the other hand, using a so-called sol-gel method in which a metal alkoxide is subjected to a hydrolysis polycondensation reaction to become a metal oxide, to form a composite of a nanometer order metal oxide with the organic polymer has been extensively studied (for example, see patent documents 2 and 3). By this method, a uniform and fine dispersion of the metal oxide in the organic polymer is easy to achieve and this method has an advantage in the mean energy utilized since the polycondensation reaction occurs at a rather low temperature from around ordinary temperature to 150° C. However, there is a problem in that the production efficiency is extremely low since both the hydrolysis and polycondensation reactions need a long time. In Example 1 of patent document 2, after 48 hours of stirring treatment at room temperature to achieve hydrolysis, a further 21 hours are needed at around 100° C. for polycondensation. In a similar way in patent document 3, one day at room temperature and one more day at 80° C. are needed for each reaction.

To gain an organic-inorganic composite material by the sol-gel method, a metal alkoxide which can cause the sol-gel reaction is required. Therefore, it is impossible to form a composite using metal species which do not form a metal alkoxide. Metal alkoxides are generally expensive materials and composites thereof become expensive to produce.

A production method of a composite of polyamide and glass is known (for example, see patent document 4). The invention described in patent document 4 produces a composite of glass and polyamide easily using inexpensive water glass by putting (A) an aqueous solution phase including water, water glass and diamine monomer into contact with (B) an organic solution phase including organic solvents and acylated dicarboxylic acid monomer, and reacting the monomers by a polycondensation reaction at the boundary face of both solution phases. However, the properties provided to the composite are limited to thermal and mechanical stability and other properties cannot be provided since only glass as an inorganic composition can be introduced to the polyamide by the invention.

Patent document 1
Japanese Unexamined Patent Application, First Publication No. Hei6-279615
Patent document 2
Japanese Unexamined Patent Application, First Publication No. Hei8-157735
Patent document 3
Japanese Unexamined Patent Application, First Publication No. Hei8-319362
Patent document 4
Japanese Unexamined Patent Application, First Publication No. Hei10-176106

DISCLOSURE OF THE INVENTION

A problem to be solved by the present invention is to provide organic-inorganic composite materials of organic polymers and inorganic compounds in which a high content of the inorganic compound particles are uniformly and finely dispersed into the organic polymers. Another problem is to provide easy production methods of the organic-inorganic composite materials.

The inventors achieved the present invention having found that composites of organic polymers and various metal compounds (hereinafter referred to as organic-inorganic composite materials) can be produced easily from a quick, 1-step reaction under ordinary temperature and pressure by stirring to mix and reacting (A) an organic solution wherein at least one compound selected from the group consisting of halide dicarboxylates, dichloroformate compounds, and phosgene compounds is dissolved in an organic solvent; and (B) a basic aqueous solution comprising; a metal compound of at least one of a metal oxide, a metal hydroxide, and a metal carbonate of at least one alkali metal element and at least one metal element selected from the group consisting of groups 3 to 12 transition metal elements of the periodic table, and groups 13 to 16 main metal elements of the periodic table, and diamine; and this organic-inorganic composite material is in a state such that the nanometer size inorganic compounds are uniformly and finely dispersed in the organic polymer at a high content.

Namely, the present invention provides organic-inorganic composite materials comprising at least one organic polymer selected from the group consisting of polyamide, polyurethane, and polyurea, and at least one metal compound particle selected from the group consisting of metal oxides of groups 3 to 12 transition metal elements of the periodic table, metal oxide of groups 13 to 16 main metal elements of the periodic table, a metal hydroxide of above metal element, and a metal carbonate of above metal element, which is finely dispersed in the organic polymer matrix, and the average particle size of the inorganic compound particles is 1 μm or less and the content of the inorganic compound particles of the composite is from 20 to 80 wt % per 100 wt % of the composite.

In the organic-inorganic composite of the present invention, the inorganic compound is finely dispersed at nanometer order in the organic polymer matrix. The content of the inorganic compound is high, also. Therefore, the organic-inorganic composite material of the present invention possesses the properties of organic materials such as moldability and flexibility and the properties of various metal oxides such as hardness, catalytic power, insulating property, semiconducting property, electron conductivity, ionic conductivity, large specific surface area, high heat resistance, wear resistance, and dimensional stability to temperature changes or moisture absorption at the same time.

The present invention provides a production method of the organic-inorganic composite material comprising stirring to mix and reacting (A) an organic solution wherein at least one compound selected from the group consisting of halide dicarboxylates, dichloroformate compounds, and phosgene compounds is dissolved in an organic solvent; and (B) a basic aqueous solution comprising a metal compound of at least one of a metal oxide, a metal hydroxide, and a metal carbonate of at least one alkali metal element and at least one metal element selected from the group consisting of groups 3 to 12 transition metal elements of the periodic table, and groups 13 to 16 main metal elements of the periodic table, and diamine.

BEST MODE FOR CARRYING OUT THE INVENTION

Figure 1:
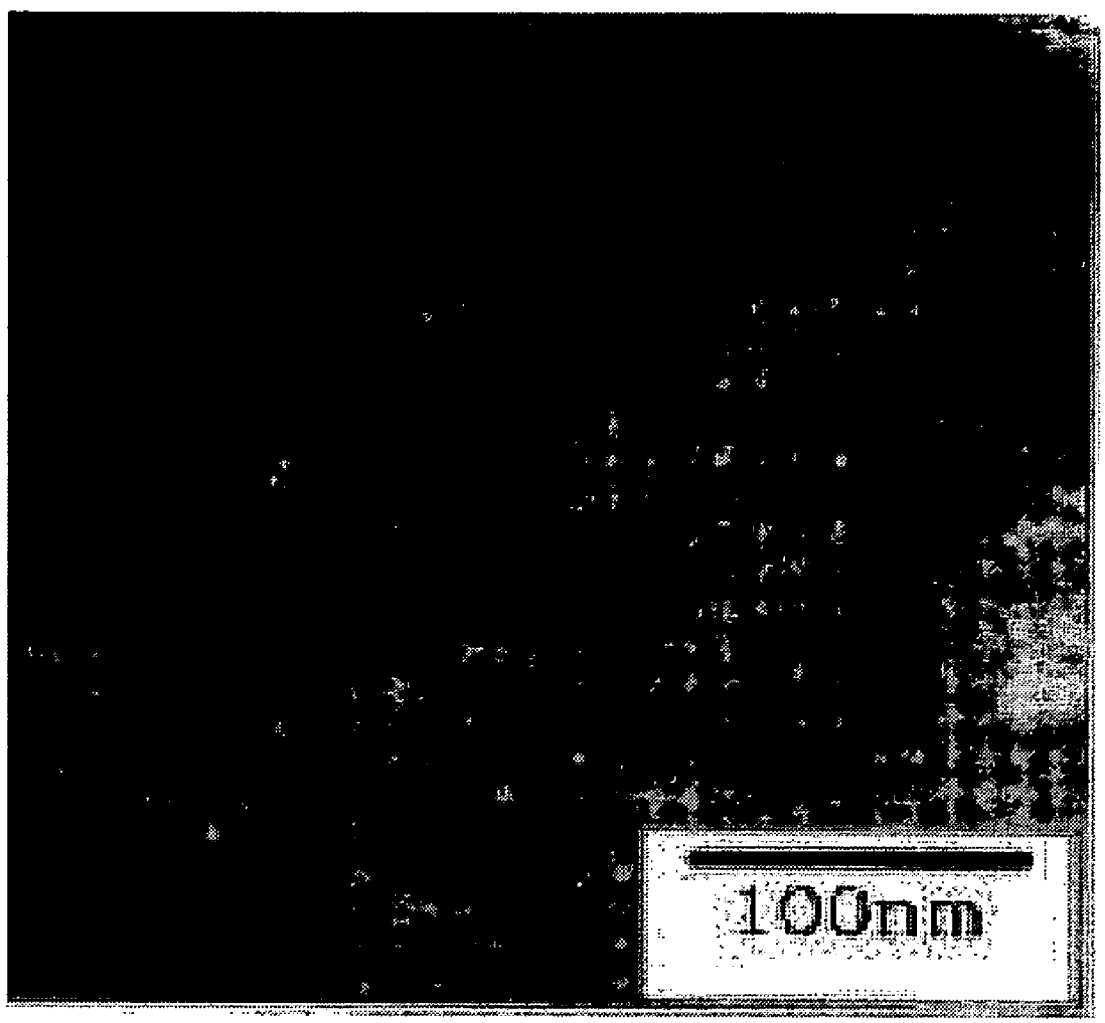
FIG. 1 is a transmission electron microscope image showing the structure of the inorganic compound particles in the composite material of alumina/ polyamide obtained by Example 1.

A more detailed description of the present invention follows.

An organic-inorganic composite material of the present invention is obtained by a polycondensation reaction by contacting (A) an organic solution wherein at least one compound selected from the group consisting of halide dicarboxylates, dichloroformate compounds, and phosgene compounds is dissolved in an organic solvent; and (B) a basic aqueous solution including a metal compound of at least one of a metal oxide, a metal hydroxide, and a metal carbonate of at least one alkali metal element and at least one metal element selected from the group consisting of groups 3 to 12 transition metal elements of the periodic table and groups 13 to 16 main metal elements of the periodic table (hereinafter referred as metal compound (1)), and a diamine.

In the production method, the organic polymer is obtained in good yield due to quick reaction of the monomer in (A) the organic solution and diamine in (B) the aqueous solution by stirring for 10 seconds to several minutes under ordinary temperature and atmospheric pressure. In this regard, the polymerization reaction of the organic polymer is accelerated by the effect of the alkali metal in the metal compound (1) as a depleting agent of a hydrogen halide generated during polymerization, while a metal compound including metal elements except alkali metal elements in metal compound (1) (hereinafter referred to as metal compound (2)) is transformed to a solid. In this regard, an organic-inorganic composite material is generated in which the metal compound particles are finely dispersed in the organic polymer due to the polymerization reaction of the organic polymer that occurs in parallel to the transformation of the metal compound (2) to a solid and either of the polymerization reaction or transformation does not progress.

Organic Solvents Used as (A) an Organic Solution

In the case where an organic solvent which is insoluble in water is used as (A) an organic solution, the polymerization reaction generated is an interfacial polycondensation reaction only at the interface of (A) the organic solution and (B) the aqueous solution. In this case, a fibrous composite is obtained easily since the molecular weight of the organic polymer obtained can be higher. High-strength long fibers can be obtained by spinning while drawing the composite film formed at the interface between (A) the organic solution and (B) the aqueous solution.

On the other hand, in the case where an organic solvent which is soluble in water is used, a powdery composite is obtained easily since the polymerization is generated in the state of emulsification of the organic solvent and water.

Any organic solvents used as (A) the organic solution in the present invention can be used without any specific limitation if the organic solvent does not react with various monomers in the above mentioned (A) organic solution or diamine and dissolves the various monomers in (A) the organic solution. Among these solvents, aromatic hydrocarbons such as toluene and xylene; aliphatic hydrocarbons such as n-hexane; halogenated hydrocarbons such as chloroform and methylene chloride; alicyclic hydrocarbons such as cyclohexane are exemplified as organic solvents which are insoluble in water.

Ethers such as tetrahydrofuran; ketones such as methylketone methylethylketone; are representative examples of organic solvents which are soluble in water.

Halide Dicarboxylates

Halide dicarboxylates used as (A) the organic solution in the present invention are, for example, an acid halide of an aliphatic dicarboxylic acid such as succinic acid, adipic acid, azelaic acid, and sebacic acid; an acid halide of an aromatic dicarboxylic acid such as isophthalic acid and terephthalic acid; or an acid halide of an aromatic dicarboxylic acid in which hydrogen of the benzene ring is substituted by a halogen atom, nitro group, alkyl group or the like. These can be used alone or in combination of 2 or more. Among these, in the case where an acid halide of an aliphatic dicarboxylic acid such as adipoyl chloride, azelaoyl chloride, and sebacil chloride is used, a fibrous organic-inorganic composite material can be obtained easily and the composite can be fabricated into a nonwoven fabric or the like.

Dichloroformate Compounds

Dichloroformate compounds that can be used as (A) the organic solution in the present invention include, for example, aliphatic diols such as 1,2-ethanediol, 1,3-propanediol, 1,4-butanediol, 1,6-hexanediol, 1,8-octanediol; a compound wherein all hydroxyl groups of divalent phenols changed to chloroformate by phosgene processing in which examples of the divalent phenols include a compound having 2 hydroxy groups on 1 or more than 2 aromatic rings such as resorcin, (1,3-dihydroxybenzene), hydroquinone (1,4-dihydroxybenzene), 1,6-dihydroxynaphthalene, 2,2'-biphenol, bisphenol S, bisphenol A, tetramethylbiphenol. These can be used alone or in combination of 2 or more.

Phosgene Compounds

Phosgene compounds used as (A) the organic solution in the present invention include, for example, phosgene, diphosgene, and triphosgene. These can be used alone or in combination of 2 or more.

In the present invention, an organic polymer matrix of the organic-inorganic composite material can be changed by selecting a monomer used in (A) the organic solution. In the case where halide dicarboxylates are used as a monomer, a polyamide is obtained by the reaction of (B) the aqueous solution, and in the case of a dichloroformate compound, polyurethane is obtained, and in the case of phosgene compounds, polyurea is obtained.

Diamine

As the diamine used in (B) the aqueous solution of the present invention, any diamines can be used without specific limitation if the organic polymer is generated by reaction with each monomer in (A) the organic solution. Aliphatic diamines such as 1,2-diaminoethane, 1,3-diaminopropane, 1,4-diaminobutane, 1,6-diaminohexane, and 1,8-diaminooctane; aromatic diamines such as m-xylylene diamine, p-xylylene diamine, m-phenylene diamine, p-phenylene diamine, 1,5-diaminonaphthalene, 1,8-diaminonaphthalene, and 2,3-diaminonaphthalene; or the above aromatic diamines to which hydrogen is substituted with a halogen atom, nitro group, alkyl group or the like; are exemplified. These can be used alone or in combination of 2 or more. Among these, the use of an aliphatic diamine such as 1,3-diaminopropane, 1,4-diaminobutane, and 1,6-diaminohexane is particularly preferable since the fibrous organic-inorganic composite material can be obtained easily and the composite can be fabricated into a nonwoven fabric or the like.

The concentration of the monomer in (A) the organic solution and (B) the aqueous solution is not limited specifically if the polymerization reaction progresses efficiently, however, 0.01 to 3 mol/L a concentration range of both is preferable and 0.05 to 1 mol/L of both is particularly preferable in the viewpoint of contacting each monomers efficiently.

The organic-inorganic composite material of the present invention can be in pulp form. In this pulp form, the diameter of the pulp is preferably 20 μm or less and the aspect ratio is preferably 10 or more.

The organic-inorganic composite material of the present invention includes at least one inorganic compound particle selected from the group consisting of a metal oxide of groups 3 to 12 of transition metal elements of the periodic table or groups 13 to 16 main metal elements of the periodic table, metal hydroxide of above metal element, metal carbonate of above metal element which finely disperses into the matrix of the organic polymer.

The transition metal element here broadly means a transition metal element including groups 11 and 12 of the periodic table including copper and zinc. Specifically, the transition metal element of groups 3 to 12 of the present invention means 21 Sc to 30 Zn of the periodic table, 39 Y to 48 Cd, 57 La to 80 Hg, 89 Ac and a metal element above 89.

The main metal element of groups 13 to 16 of the periodic table means 13 Al of the periodic table, 31 Ga, 32 Ge, 49 In, 50 Sn, 51 Sb, 81 Tl, 82 Pb, 83 Bi and 84 Po.

As the metal compound (1) used in (B) the aqueous solution of the present invention, a metal oxide is most preferable. An example of the metal compound (1) is a compound represented by the general formula $A_xM_yB_z$. In this regard, "A" represents alkali metal elements, "M" represents transition metal elements of groups 3 to 12 or main metal elements of groups 13 to 16, "B" represents at least one selected from the group of O, $CO_3$, and OH, and "x", "y", and "z" represent numbers which make the bonding of "A", "M" and "B" possible. As the compound represented by the above general formula $A_xM_yB_z$, a compound which shows complete or partial solubility in water and shows basicity is preferable. The metal compound (1) in which the metal compound (2) which is the rest that alkali metal is removed from the metal compound (1) by the action of the depleting agent of the hydrogen halide generated at the polymerization is insoluble or hardly soluble in water is preferable since it is possible to form a composite of the metal compound in the organic polymer more effectively.

In the metal compound (1) used in the present invention, as the compound in which "B" of the above general formula is O, a sodium compound oxide such as sodium zincate, sodium aluminate, sodium chromite, sodium ferrite, sodium molybdate, tin sodium, sodium tantalite, sodium titanate, sodium vanadate, sodium tungstate, sodium zirconate; a potassium compound oxide such as potassium zincate, potassium aluminate, potassium chromite, potassium molybdate, potassium stannate, potassium manganate, potassium tantalite, potassium ferrate, potassium titanate, potassium vanadate, potassium tungstate, potassium aurate, potassium argentite, potassium zirconate, potassium antimonite; a lithium compound oxide such as lithium aluminate, lithium molybdate, lithium stannate, lithium manganate, lithium tantalite, lithium titanate, lithium vanadate, lithium tungstate, lithium zirconate; a rubidium compound oxide, or a cesium compound oxide is used preferably.

As the metal compound (1) in which "B" of the above general formula includes both $CO_3$ and OH, potassium zinc carbonate, potassium nickel carbonate, potassium zirconium carbonate, potassium cobalt carbonate, and potassium tin carbonate are exemplified.

These metal compounds (1) can be hydrated since they are used by dissolving into water. These can be used alone or in combination of 2 or more.

(B) the aqueous solution of the present invention can include water glass. The composite of the organic polymer, metal compound, and silica can be obtained by a polymerization reaction under conditions in which water glass coexists. As the water glass used, water glasses represented by the composition formula of $A_2O \cdot nSiO_2$ wherein "A" represents alkali metal elements and the average of "n" is 1.8 to 4 such as water glass 1, 2, and 3 registered in JIS K 1408 are exemplified. The alkali metal included in the water glass also accelerates the polymerization reaction by acting as a depleting agent of acids generated at the polymerization, as the same as the alkali metal in the metal compound (1).

The contents of the particles of the metal compound (2) in the organic-inorganic composite material can be controlled by adjusting the concentration of the metal compound (1) in (B) the aqueous solution. The content of the particles of the metal compound (2) which are included in the organic-inorganic composite material of the present invention is within the range from 20 to 80 wt % based on the total weight of the organic-inorganic compound. In the case where the content of the metal compound (2) is less than 20 wt %, the inherent functions of the metal compound (2) which affects the organic-inorganic composite material is insufficient. In the case where the content exceeds 80 wt % and is an excessive amount, the functions of the organic compound which affects to the organic-inorganic composite material decreases, thereby causing negative effects, for example, the workability becomes worse and the strength in papermaking becomes weak when it is used as paper.

The concentration of the metal compound (1) in (B) the aqueous solution is determined by the monomer concentration in (A) the organic solution or (B) the aqueous solution to a certain degree, however, a range from 1 to 500 g/L is preferable in order to maintain a high yield of the organic-inorganic composite material and prevent a side reaction of the monomer in (A) the organic solution with water which is generated by the excess heat during polymerization.

In the case where the concentration of the metal compound (1) in (B) the aqueous solution is lowered for the purpose of producing an organic-inorganic composite material having a lower content of the metal compound, the hydrogen halide generated in the polymerization reaction cannot be neutralized sufficiently to allow the reaction to progress due to the shortage of the amount of alkali metal in the synthesis system. In that case, an acid acceptor such as sodium hydrate, potassium hydrate, sodium carbonate, and potassium carbonate can be added to (B) the aqueous solution or the solution of above acid acceptor can be added to the synthesis system, later.

It is preferable that the metal compound (1) used in (B) the aqueous solution has a higher basicity than the diamine. More specifically, it is preferable that the pH value by dissolving the metal compound (1) in (B) the aqueous solution is higher than the pH value by dissolving the diamine in (B) the aqueous solution. It has already been described that the alkali metal in the metal compound (1) has an action to accelerate the polycondensation reaction by neutralizing hydrogen halide generated at the time of the polycondensation reaction. At this time, when the basicity of the diamine is higher than that of the metal compound (1), the hydrogen halide generated in the polycondensation reaction would not react with the alkali metal in the metal compound (1) and a side reaction reacting with the diamine would be preferentially generated. Accordingly, the diamine is consumed and the polymer yield might be significantly reduced. Additionally, when the side reaction is generated, the metal compound (1) does not transform to the metal compound (2) since the alkali metal is not removed from the metal compound (1), and the yield of metal compound is significantly reduced since the metal compound (1) remains in the state of a solution in (B) the aqueous solution and the composite is not generated with the organic polymer.

In the case where the basicity of the metal compound (1) is low, the objective polymerization reaction can be accomplished in good yield by selecting a diamine having furthermore lower basicity. In the case where the diamine is a fatty series, the basicity tends to be lower when the number of carbons is lower. In the case where the diamine is an aromatic series, any compound can be used preferably due to the lower basicity, generally.

In the present invention, any known and conventional surface active surfactant can be used for the purpose of bringing (A) the organic solution in contact with (B) the aqueous solution sufficiently.

The production equipment for the organic-inorganic composite material of the present invention is not limited specifically if it can react (A) the organic solution with (B) the aqueous solution by the contact reaction sufficiently, and any system of continuous or batch system can be employed. Specific equipment for the continuous system includes, for example, "Fine Flow Mill FM-15" and "Spiral Pin Mixer SPM-15" manufactured by Pacific Machinery & Engineering Co., Ltd and "Dynamic Mixer DLM/S215" manufactured by Indag Maschinenbau GmbH. In the case of a batch system, a general-purpose mixing device which has a propeller type blade, maxblend impeller, Pfaudler, or the like can be used.

In the case where an aliphatic halide dicarboxylate is used as a constituent of (A) the organic solution and an aliphatic diamine is used as a constituent of (B) the aqueous solution, a strong gelatinous material may be generated by the reaction. In that case, a mixer having a high shear force to crush the gel and to allow the reaction to progress is preferably used, for example, a blender manufactured by Oseterizer.

The temperature of the polycondensation reaction between (A) the organic solution and (B) the aqueous solution is sufficient to react in the range from −10 to 50° C. of approximately ordinary temperature. This reaction does not need pressurization nor depressurization at all. The amount of time required for the polymerization reaction depends on the monomer used or the reaction device, however, the polymerization reaction is generally completed after a short time of approximately 10 minutes.

As the inorganic compound for the organic-inorganic composite material of the present invention, at least one inorganic compound selected from the group-consisting of a metal oxide of groups 3 to 12 transition metal elements of the periodic table, a metal oxide of groups 13 to 16 main metal elements of the periodic table, a metal hydroxide of above metal element, and a metal carbonate of above metal element is included. As the inorganic compound, the metal oxide is preferable. As the metal oxide, aluminum oxide, tin oxide, zirconium oxide, zinc oxide, manganese oxide, molybdenum oxide, and tungsten oxide are exemplified. Among these, aluminum oxide is preferable because of the small average particle size of the fine particles and the excellent fine dispersibility.

On the other hand, examples of the organic polymer for the organic-inorganic composite material of the present invention are polyamide, polyurethane, and polyurea depending on the monomer used in the organic solution at the time of synthesis. The dispersion state of the inorganic compound in the organic polymer differs depending on the combination of the metal compound (2), which is the inorganic compound, and the organic polymer. Among these combinations, an organic-inorganic composite material in which fine particles of aluminum oxide are finely dispersed into the polyamide of the organic polymer matrix is an especially preferable embodiment.

The dispersion state was measured by the following measurement method. First, the organic-inorganic composite material was heat-pressed for 2 hours under conditions of 170° C. and 20 MPa/cm$^2$ and a thin section of the organic-inorganic composite material of approximately 1 mm thickness was obtained. Next, this composite material was made into an ultra-thin section of 75 nm using a microtome. The obtained section was observed at 100,000-fold magnification by a transmission electron microscope "JEM-200CX" manufactured by JEOL Ltd. The inorganic compounds of Examples of the present invention were observed as a dark image and are finely dispersed in the bright image of the organic polymer. The particle sizes of 100 fine particles of the inorganic compound were measured and the average was taken as the average particle size of the inorganic compound.

(Aluminum Oxide/Polyamide)

When the inorganic compound was aluminum oxide and the organic polymer was an aliphatic polyamide, it was observed that fine particles of plate-like aluminum oxide having a thickness of approximately 1 nm and length of plane of approximately 20 nm were dispersed in the polyamide matrix in a so-called 2-dimensional network structure in which the particles were connected in the plane direction.

(Tin Oxide/Polyamide)

When the inorganic compound was tin oxide and the organic polymer was aliphatic polyamide, it was observed that each of the tin oxide fine particles having a spherical shape and diameter of approximately 100 to 1,000 nm was dispersed in the polyamide matrix independently.

(Aluminum Oxide/Polyurea)

When the inorganic compound was aluminum oxide and the organic polymer was an aliphatic polyurea, it was observed that fine particles of aluminum oxide having a spherical shape of approximately 10 nm diameter were dispersed in the polyurea matrix in a so-called 3-dimensional network structure in which the particles were connected in all directions.

(Tin Oxide/Polyurea)

When the inorganic compound was tin oxide and the organic polymer was aliphatic polyurea, it was observed that the each of the fine particles of the metal oxide having a spherical shape of approximately 100 to 1,000 nm diameter was dispersed in the polyurea matrix independently.

(Aluminum Oxide/Polyurethane)

When the inorganic compound was aluminum oxide and the organic polymer was aliphatic polyurethane, it was observed that fine particles of aluminum oxide having a spherical shape of approximately 10 nm diameter were dispersed in the polyurethane matrix in a so-called 3-dimensional network structure in which the particles were connected in all directions.

(Tin Oxide/Polyurethane)

When the inorganic compound was tin oxide and the organic polymer was aliphatic polyurethane, it was observed that each of the fine particles of the metal oxide spherical shape of approximately 100 to 1,000 nm diameter was dispersed in the polyurethane matrix independently.

(Average Particle Size)

The average particle size of fine particles of the inorganic compound in the organic-inorganic composite material of the present invention is preferably 500 nm or less, more preferably 150 nm or less and most preferably 100 nm or less from the viewpoint of obtaining a high effect of the composite.

EXAMPLES

The present invention is explained specifically by the examples as follows. "Part" represents "part by weight" unless otherwise noted.

Example 1

Aluminum Oxide (Alumina)/Polyamide Composite 1.58 parts 1,6-diaminohexane and 2.96 parts sodium aluminate.n hydrate (a mixture material of sodium meta-aluminate ($NaAlO_2$) and sodium ortho-aluminate ($Na_3AlO_3$) that of Al/NaOH=0.8) were charged into 81.1 parts ion-exchanged water. These were stirred for 15 minutes at room temperature thereby obtaining a heterogeneous and transparent (B) aqueous solution. This aqueous solution was charged into a blender bottle manufactured by Osterizer under room temperature and (A) an organic solution in which 2.49 parts adipoyl chloride is dissolved into 44.4 parts toluene was dropped for 20 seconds while the aqueous solution was stirred at 10,000 rotations per minute. The formed gel was crushed by spatula and in addition this was stirred for 40 seconds at 10,000 rotations per minute. The liquid in which the pulp product obtained by this operation was dispersed was filtrated under vacuum pressure on a filter paper of 4 μm opening using a 90 mm diameter Buchner funnel. The product on the Buchner funnel was washed by the steps of dispersing into 100 parts methanol, stirring for 30 minutes with a stirrer, and filtering under vacuum pressure. Continuously, a washing treatment in the same manner was accomplished using 100 parts distilled water and a wet cake of the white organic-inorganic composite material was obtained.

200 g of a dispersed solution in which the obtained organic-inorganic composite material was dispersed into distilled water at a concentration of 0.2 g/L was filtered under vacuum pressure on a filter paper of 4 μm opening using a 55 mm diameter Buchner funnel. An obtained cake was heat pressed for 2 minutes under conditions of 170° C. and 5 Mpa/cm² and a nonwoven fabric was formed.

Example 2

Tin Oxide/Polyamide Composite

As (B) the aqueous solution, 1.20 parts 1,4-diaminobutane and 3.96 parts sodium stannate trihydrate ($Na_2SnO_3.3H_2O$) were charged into 81.8 parts ion-exchanged water and stirred for 15 minutes at 25° C., thereby obtaining a heterogeneous and transparent (B) aqueous solution. As (A) the organic solution, an organic solution in which 3.26 parts sebacoyl chloride is dissolved into 44.4 parts toluene was prepared. In the same manner as the method described in Example 1, except for using these solution raw materials, a white organic-inorganic composite material was obtained. In the same manner as the method described in Example 1, a nonwoven fabric was formed. The obtained nonwoven fabric was highly elastic.

Example 3

Zirconium Oxide/Polyamide Composite

As (B) the aqueous solution, 1.58 parts 1,6-diaminohexane and 3.79 parts potassium zirconium carbonate ($K_2[Zr(OH)_2(CO_3)_2]$) were charged into 81.1 parts ion-exchanged water and stirred, thereby obtaining a heterogeneous and transparent solution. In the same manner as the method described in Example 1, except for using the heterogeneous and transparent solution obtained above operation, a white organic-inorganic composite material was obtained. In the same manner as the method described in Example 1, a nonwoven fabric was formed. The obtained nonwoven fabric was highly elastic.

Comparative Example 1

Aluminum Oxide Prepared by Melt Blending Method/Polyamide Composite 80.0 parts Nylon 66 pellets as the polymer and 20.0 parts aluminum oxide powder which average particle size is 100 nm are melt blended at 270° C. in a compact size twin screw extruder MP2015 manufactured by Tsubaco, thereby obtaining a pellet-form organic-inorganic composite material. The feeding operation of raw material before kneading was extremely difficult since the particle size of aluminum oxide was extremely small and the powder scattered very much.

The organic-inorganic composite materials and the nonwoven fabrics obtained in above Examples 1 to 3 and Comparative Example 1 were measured or tested for the following items and the obtained results are shown in Table 1.

(1) The Measurement Method of the Content of the Inorganic Compound (Ash Content)

The measurement method of the content of the inorganic compound included in the organic-inorganic composite material was as follows.

The organic-inorganic composite material was precisely weighed (composite weight) after absolute dry, then the constituent of the organic polymer was completely burned by firing at 700° C. for 3 hours in air, and the weight after firing was taken as the ash weight (=weight of inorganic compound). The content of inorganic compound was calculated using the following equation.

Content of inorganic compound (weight %)=(ash weight/composite weight)×100

(2) Identification of the Metal Compound Species in the Organic-Inorganic Composite Material The nonwoven fabrics of Examples 1 to 3 were clipped to a 3 cm×3 cm square, set in the measurement holder having an opening of 20 mm diameter, and used as measurement samples. The measurement sample was analyzed for all elements using X-Ray Fluorescence spectroscope "ZSX100e" manufactured by Rigaku Industrial Corporation. Using the obtained results of all the element analyses, by inputting the sample data of the measurement sample (data are; sample form: film, compound species: oxide, adjustment constituent: cellulose, and the value of weight per area of the measured sample) into the equipment, the element ratio in the composite was calculated by the FP method (Fundamental Parameter method: the uniformity and the surface smoothness of the sample is hypothesized, the value is corrected by using a constant number in the equipment, and the constituent is quantified.) All samples in Examples showed the existence of a large quantity in the objective metal composite. In addition, the contents of the objective metal compound measured by this method correspond to the calculated result of the inorganic composite content obtained in (1) with an error range of 0.5 wt %.

(3) Calculation of the Removal Ratio of Alkali Metal

The removal ratio of alkali metal was calculated using the following formula using the amount of alkali metal in the nonwoven fabric measured in (2) and the contents of alkali metal at the time of feeding of the raw material.

Removal ratio of alkali metal (%)=(1−R)×100

R=contents of alkali metal in nonwoven fabric (%)/contents of alkali metal at feeding (%)

(4) Measurement of the Particle Size of the Inorganic Compound

The organic-inorganic composite material was heat-pressed for 2 hours under conditions of 170° C. and 20 MPa/cm$^2$ and a thin section of approximately 1 mm thickness was obtained. This was made into an ultra-thin section of 75 nm using a microtome.

The obtained section was observed at 100,000-fold magnification with a transmission electron microscope "JEM-200CX" manufactured by JEOL Ltd. The inorganic compounds of Examples of the present invention were observed as a dark image and which were finely dispersed in the bright image of the organic polymer. The particle sizes of 100 fine particles of the inorganic compound were measured and the average was taken as the average particle size of the inorganic compound. FIG. 1 is an image from a transmission electron microscope showing the alumina/polyamide composite obtained by Example 1.

(5) Calculation of the Yield of the Organic-Inorganic Composite Material

The yield (%) of the organic-inorganic composite material was calculated by the following formula. In this regard, the weight actually generated was taken as the total weight of the organic-inorganic composite material.

Yield (%)=[total weight of organic-inorganic composite material generated/(weight of metal compound at theoretical yield+weight of organic polymer at theoretical yield)]×100

TABLE 1

|  | Example 1 | Example 2 | Example 3 | Comparative Example 1 |
|---|---|---|---|---|
| Inorganic compound | $Al_2O_3$ | $SnO_2$ | $ZrO_2$ | $Al_2O_3$ |
| Contents of inorganic compound (wt %) | 41 | 52 | 43 | 18 |
| Removal ratio of alkali metal | 99 | 98 | 99 | — |
| Average particle size of inorganic compound (nm) | 10 | 300 | 120 | 1800 |
| Yield (%) | 78 | 82 | 79 | — |

As shown in Comparative Example 1 of Table 1, although the aluminum oxide of 100 nm average particle size as the inorganic compound was used, the inorganic compound agglomerated during kneading, the particle size of the fine particles of the inorganic compound (aluminum oxide) in the obtained organic-inorganic composite material became 1800 nm (1.8 μm), and formation of the composite at the nanometer order could not be accomplished.

On the other hand, as shown in Examples 1 to 3, in the obtained organic-inorganic composite material obtained in the present invention, it was revealed that the compounds in which the alkali metal composing metal compound (1) was completely removed formed composite in the organic polymer uniformly. The particle size of the inorganic compound fine particle was of nanometer order and the content of the inorganic compound could be 40 wt % or more. The organic-inorganic composite material having the above properties could obtain by a short-term operation under ordinary temperature and pressure conditions.

INDUSTRIAL APPLICABILITY

The feature of the organic-inorganic composite material of the present invention is that the inorganic compound is finely dispersed in the organic polymer matrix in nanometer order. The content of the inorganic compound is large, also. Therefore, the organic-inorganic composite material possesses properties of organic materials such as formability and flexibility and the properties of various metal oxides such as hardness, catalytic power, insulating property, semiconducting property, electron conductivity, ionic conductivity, large specific surface area, high heat resistance, wear resistance, and dimensional stability to temperature changes or moisture absorption at the same time. Therefore, the organic-inorganic composite material of the present invention is extremely useful industrially

The invention claimed is:

1. A method for producing an organic-inorganic composite material comprising:

at least one organic polymer selected from the group consisting of polyamide, polyurethane, and polyurea,
and an inorganic compound particle selected from the group consisting of metal oxides of groups 3 to 12 transition metal elements of the periodic table, metal oxides of main metal elements selected from the group consisting of 13 Al, 31 Ga, 32 Ge, 49 In, 50 Sn, 51 Sb, 82 Pb and 83 Bi of the periodic table, metal hydroxides of said transition and main metal elements, and metal carbonates of said transition and main metal elements, which is finely dispersed in the organic polymer matrix,
wherein the inorganic compound particles have an average particle size which is not greater than 500 nm, and
the content of the inorganic compound particles in the composite is from 20 to 80 weight % per 100 weight % of the composite,
said method comprising:
mixing and reacting:
(A) an organic solution formed by dissolving at least one compound selected from the group consisting of halide dicarboxylates, dichloroformate compounds and phosgene compounds in an organic solvent; and
(B) a basic aqueous solution comprising:
a metal compound of at least one of a metal oxide, a metal hydroxide and a metal carbonate of at least one alkali metal element and at least one metal element selected from the group consisting of groups 3 to 12 transition metal elements of the periodic table and main metal elements selected from the group consisting of 13 Al, 31 Ga, 32 Ge, 49 In, 50 Sn, 51 Sb, 82 Pb and 83 Bi of the periodic table, and a diamine.

2. The method for producing the organic-inorganic composite material according to claim 1, comprising:
using the organic solvent which is insoluble in water as an organic medium for (A) the organic solution, and
reacting by a polycondensation reaction which is a boundary phase polycondensation reaction generated only at the boundary phase between (A) the organic solution and (B) the aqueous solution.

3. The method for producing the organic-inorganic composite material according to claim 2, comprising spinning fibers while drawing the composite film generated at the boundary phase between (A) the organic solution and (B) the aqueous solution.

4. The method for producing the organic-inorganic composite material according to claim 1, wherein the organic solvent is an organic medium which is soluble in water.

5. The method for producing the organic-inorganic composite material according to claim 1, wherein the metal compound used for the aqueous solution has a higher basicity than that of the diamine.

6. The method for producing the organic-inorganic composite material according to claim 1, comprising polycondensation reacting of (A) the organic solution and (B) the aqueous solution, wherein the reaction temperature is from $-10°$ C. to $50°$ C.

7. The method for producing the organic-inorganic composite material according to claim 1, wherein the inorganic compound is a metal oxide.

8. The method for producing the organic-inorganic composite material according to claim 7, wherein the metal oxide is aluminum oxide.

* * * * *